United States Patent
El-Imad et al.

(10) Patent No.: US 10,863,161 B2
(45) Date of Patent: Dec. 8, 2020

(54) HMD DELIVERY SYSTEM AND METHOD

(71) Applicant: Virtually Live (Switzerland) GMBH, Zurich (CH)

(72) Inventors: Jamil El-Imad, Zurich (CH); Jesús Hormigo, Zurich (CH)

(73) Assignee: Virtually Live (Switzerland) GMBH, Zurich (CH)

( * ) Notice: Subject to any disclaimer, the term of this patent is extended or adjusted under 35 U.S.C. 154(b) by 0 days.

(21) Appl. No.: 16/342,184

(22) PCT Filed: Oct. 18, 2017

(86) PCT No.: PCT/GB2017/053149
§ 371 (c)(1),
(2) Date: Apr. 15, 2019

(87) PCT Pub. No.: WO2018/073584
PCT Pub. Date: Apr. 26, 2018

(65) Prior Publication Data
US 2019/0253692 A1    Aug. 15, 2019

(30) Foreign Application Priority Data
Oct. 18, 2016   (GB) .................................. 1617595.2

(51) Int. Cl.
*H04N 21/43* (2011.01)
*H04N 21/218* (2011.01)
(Continued)

(52) U.S. Cl.
CPC ......... *H04N 13/194* (2018.05); *G02B 27/017* (2013.01); *H04N 13/156* (2018.05);
(Continued)

(58) Field of Classification Search
CPC ............... H04N 13/194; H04N 21/816; H04N 21/6587; H04N 21/21805; H04N 21/4307;
(Continued)

(56) References Cited

U.S. PATENT DOCUMENTS

2016/0189429 A1   6/2016  Mallinson
2019/0043236 A1*  2/2019  Jones .................... G06K 9/4652
(Continued)

OTHER PUBLICATIONS

International Written Opinion from International Application No. PCT/GB2017/053149, dated Jan. 23, 2018, 6 pages.
(Continued)

*Primary Examiner* — Helen Shibru
(74) *Attorney, Agent, or Firm* — TraskBritt

(57) ABSTRACT

A head-mounted display image delivery system in combination with a head-mounted display (HMD) device, the image delivery system and the HMD device being local to one another. The HMD device includes: one or more displays; one or more sensors to determine movement, position and attitude of the display; and one or more image inputs configured to receive image data for direct display on the one or more displays without image processing by the HMD from the image delivery system. The image delivery system is configured to communicate a stereoscopic image to the HMD system to convey image information to a wearer.

21 Claims, 8 Drawing Sheets

(51) Int. Cl.
*H04N 21/6587* (2011.01)
*H04N 13/194* (2018.01)
*G02B 27/01* (2006.01)
*H04N 13/344* (2018.01)
*H04N 13/161* (2018.01)
*H04N 21/81* (2011.01)
*H04N 13/156* (2018.01)

(52) U.S. Cl.
CPC ......... *H04N 13/161* (2018.05); *H04N 13/344* (2018.05); *H04N 21/21805* (2013.01); *H04N 21/4307* (2013.01); *H04N 21/6587* (2013.01); *H04N 21/816* (2013.01); *G02B 2027/014* (2013.01); *G02B 2027/0187* (2013.01)

(58) Field of Classification Search
CPC .. H04N 13/161; H04N 13/344; H04N 13/156; H04N 13/167; H04N 13/366; G02B 27/017; G02B 2027/0187; G02B 2027/014
USPC .......................................................... 348/43
See application file for complete search history.

(56) References Cited

U.S. PATENT DOCUMENTS

2019/0179409 A1\* 6/2019 Jones ................. G02B 27/0093
2019/0370926 A1\* 12/2019 Hagland ................. G06T 19/00

OTHER PUBLICATIONS

International Search Report from International Application No. PCT/GB2017/053149, dated Jan. 23, 2018, 3 pages.

\* cited by examiner

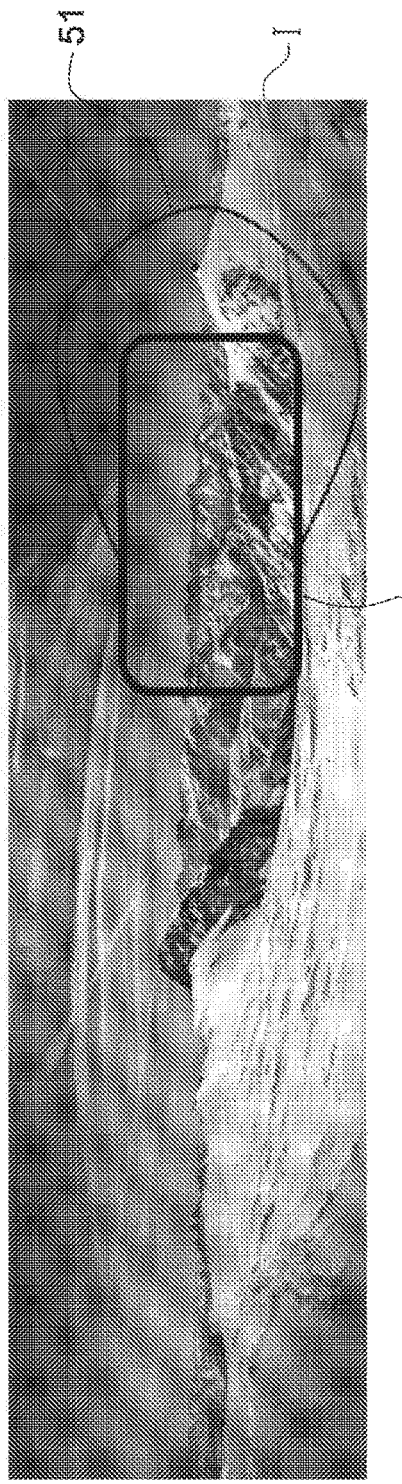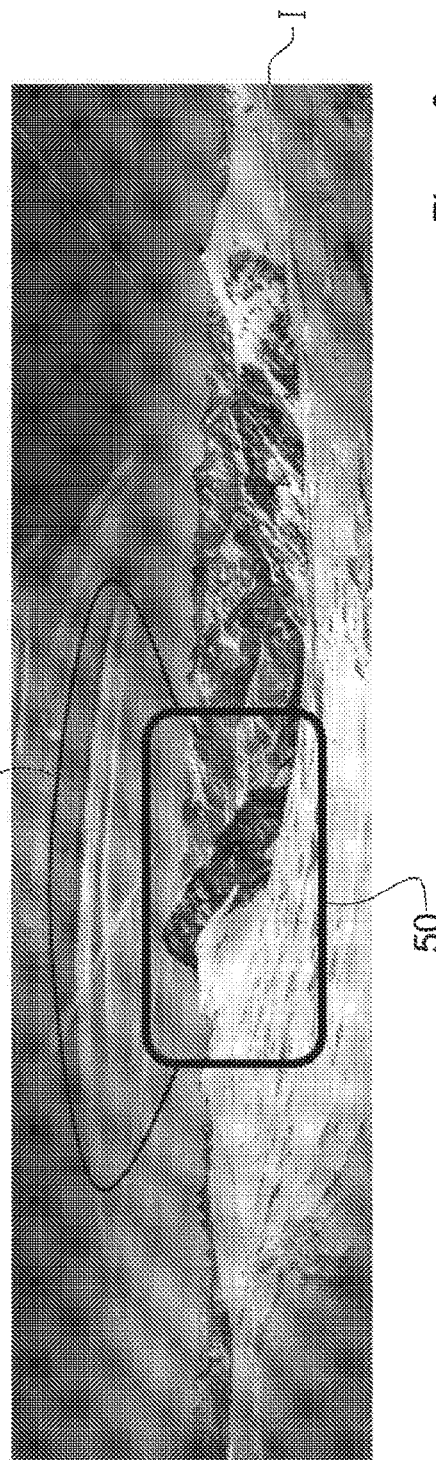

HMD DELIVERY SYSTEM AND METHOD

CROSS-REFERENCE TO RELATED APPLICATIONS

This application is a national phase entry under 35 U.S.C. § 371 of International Patent Application PCT/GB2017/053149, filed Oct. 18, 2017, designating the United States of America and published in English as International Patent Publication WO 2018/073584 A1 on Apr. 26, 2018, which claims the benefit under Article 8 of the Patent Cooperation Treaty to Great Britain Patent Application Serial No. 1617595.2, filed Oct. 18, 2016, the disclosure of each of which is hereby incorporated herein in its entirety by this reference.

TECHNICAL FIELD

This disclosure relates to head-mounted displays and to systems and methods for delivering content to head-mounted displays, particularly virtual reality content.

BACKGROUND

Viewing virtual reality content requires the viewer/participant to have access to substantial hardware, software and/or bandwidth. It is an object of this disclosure to reduce the hardware, software and bandwidth requirements to allow viewing and participation in virtual reality events.

A typical virtual reality set-up will comprise:
- a head-mounted display (HMD) that displays a stereoscopic 3D image of a virtual environment in computer graphics, photorealistic graphics or real 3D video;
- sensors both on the HMD and remote from the HMD to determine HMD position and attitude in the real environment and measure HMD movements via accelerometers and the like, e.g., HMD mounted accelerometers measure HMD movement, location and attitude (roll, pitch, yaw), a handheld user interface device takes commands from the user, and a remote sensor array can track the position of the HMD on the user in a "safe zone" created by the user and visible to the user within the virtual environment;
- a computer having a powerful processor to generate images to populate the virtual environment and to determine the user's position and reactions in the virtual environment and a high-end graphics card to render the images in stereoscopic 3D on the user's HMD.

There are also power supply requirements and communication bandwidth requirements.

A head-mounted display (HMD) displays a stereoscopic 3D image of a virtual environment in computer graphics, photorealistic graphics or real 3D video. 2D images can be used as the 3D effect is not essential. The HMD has a number of sensors.

The user interface and HMD may incorporate sensors to determine the relative position of the user interface with respect to the HMD or with respect to the remote sensor array. The user interface, such as a selection pointer may be rendered in a virtual environment.

Typical virtual reality set ups are computationally intensive primarily because of the processing power to render fast moving images without delay on a high spec graphics card.

Delays in rendering the image at the head-mounted display can cause motion sickness and do not provide a satisfactory user experience. The threshold of acceptable latency for when a user is involved in virtual reality interaction with a head-mounted display is of the order of 20 milliseconds. Where latency is greater than 20 milliseconds, nausea and motion sickness can result.

If a wearer is not involved in virtual reality interaction with the head-mounted display and is simply watching a video, then latency would not be an issue. Head-mounted displays should deliver video at least 60 frames/second (fps) to offer a comfortable viewing experience. Frame rates of greater than 90 fps are preferred. Conventional virtual reality head-mounted display image delivery systems are high powered and high specified computers with graphic cards; or games consoles, which are specifically built to render high quality and fast moving graphics.

BRIEF SUMMARY

One aspect of the disclosure provides a head-mounted display image delivery system configured to communicate a stereoscopic image to a head-mounted display (HMD) device to convey image information to a wearer, the image delivery system and the HMD system being local to one another, the HMD system comprising: one or more displays showing a field of view; one or more sensors; one or more image inputs configured to receive image data for direct display of the field of view on the one or more displays without image processing by the HMD system from the image delivery system, wherein the image delivery system comprises: one or more inputs to receive sensor data from the sensors; one or more image inputs configured to receive pre-processed image data for direct display of the field of view on the one or more displays without image processing by the image delivery system; one or more image outputs to deliver image data for direct display on the one or more displays of the field of view without image processing by the HMD system.

A further aspect of this disclosure provides a system comprising a head-mounted display image delivery system in combination with a head-mounted display (HMD) device, the image delivery system and the HMD device being local to one another, the combination further comprising a graphics processing and computational resource remote from the image delivery system and the HMD device and connected to the image delivery system and the HMD device by a communication bus:
  the HMD device comprising:
    one or more displays;
    one or more sensors to determine movement, position and attitude of the display; and
    one or more image inputs configured to receive image data for direct display on the one or more displays without image processing by the HMD from the image delivery system,
  the image delivery system being configured to communicate a stereoscopic image to the HMD system to convey image information to a wearer, wherein the image delivery system comprises:
    one or more inputs to receive sensor data from the sensors;
    one or more image inputs configured to receive pre-processed image data for direct display of the field of view on the one or more displays without image processing by the image delivery system;
    one or more image outputs to deliver image data for direct display on the one or more displays of the field of view without image processing by the HMD system, wherein:

the graphics processing and computational resource has the functionality to conduct the majority of the image processing and rendering of images over the communication bus to the image delivery system.

One aspect of the disclosure provides a head-mounted display image delivery system in combination with a head-mounted display (HMD) device, the image delivery system and the HMD device are local to one another:

the HMD device comprising: one or more displays; one or more sensors to determine movement, position and attitude of the display; and one or more image inputs configured to receive image data for direct display on the one or more displays without image processing by the HMD from the image delivery system, the image delivery system being configured to communicate a stereoscopic image to the HMD system to convey image information to a wearer, wherein the image delivery system comprises: one or more inputs to receive sensor data from the sensors; one or more image inputs configured to receive pre-processed image data for direct display of the field of view on the one or more displays without image processing by the image delivery system; one or more image outputs to deliver image data for direct display on the one or more displays of the field of view without image processing by the HMD system.

Another aspect of this disclosure provides the head-mounted display image delivery system in combination with the head-mounted display (HMD) device and further comprises a computer resource having a powerful processor to generate images to populate the virtual environment and to determine the user's position and reactions in the virtual environment and a high-end graphics card to render the images in stereoscopic 3D for delivery to the user's HMD via the image delivery system.

A further aspect of the disclosure provides the head-mounted display image delivery system of the disclosure without the head-mounted display device.

Another aspect of the disclosure provides the head-mounted display device of the disclosure without the head-mounted display image delivery system.

A further aspect of the disclosure provides a method of operating a head-mounted display image delivery system configured to communicate a stereoscopic image to a head-mounted display (HMD) device.

BRIEF DESCRIPTION OF THE DRAWINGS

In order that the disclosure may be more readily understood, embodiments thereof will now be described, by way of example, with reference to the accompanying drawings, in which:

FIGS. 7 and 8 show a field of view for use with embodiments of the disclosure.

DETAILED DESCRIPTION

Figure 1:
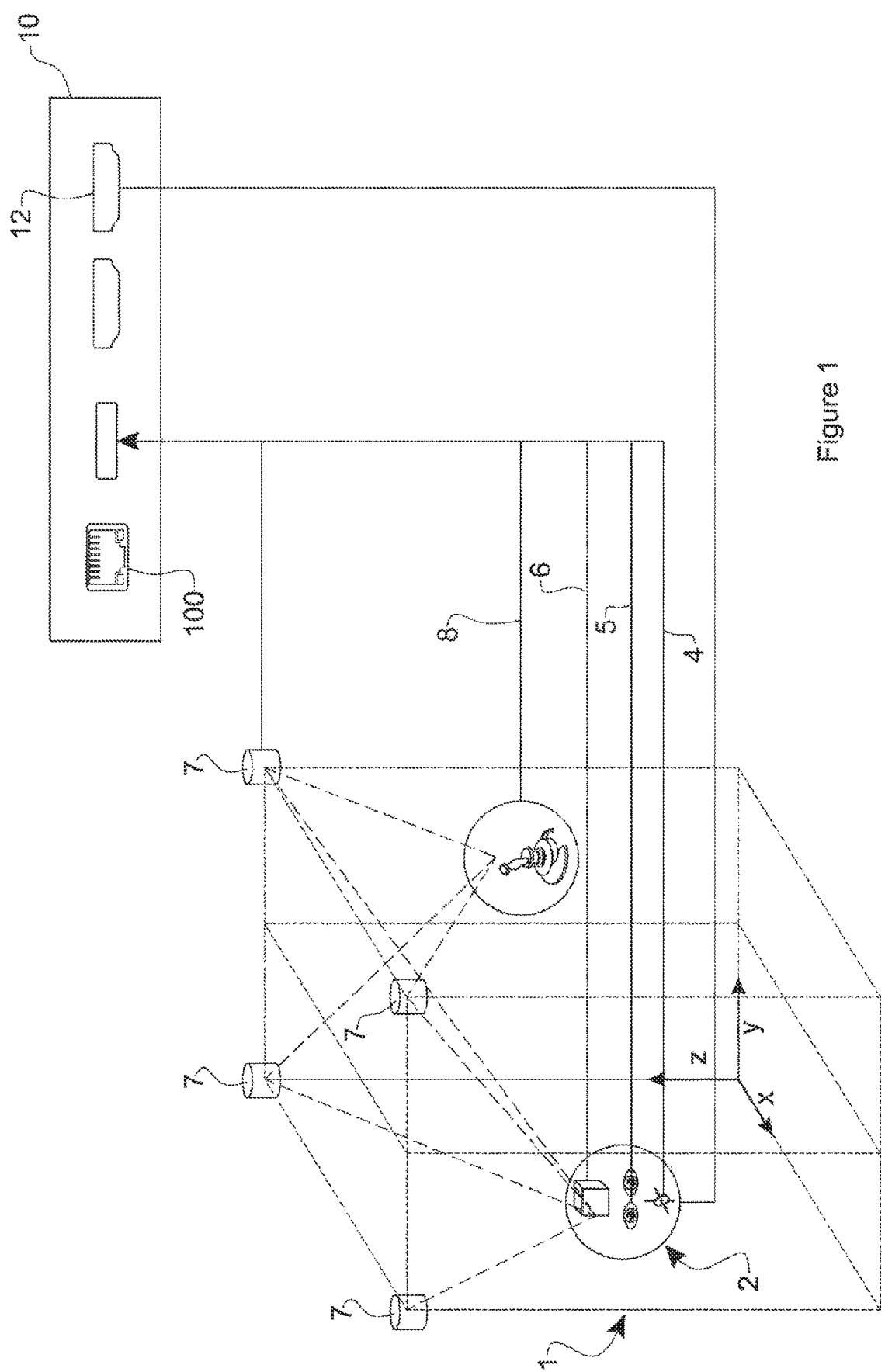
FIG. 1 is a schematic representation of a head-mounted display system with an external sensor array.

Referring to FIG. 1, a head-mounted display (HMD) system 1 is shown schematically and comprises the following basic components: a head-mounted display mask 2 containing a one or more display screens 3 (not shown in FIG. 1), a motion and position sensor 4, an eye tracker 5 and further motion and position sensor 6. FIG. 1 also shows an array 7 of sensors external to the mask 2 to detect the position in an xyz coordinate system of the position marker 6. FIG. 1 also shows a user interface device comprising a joystick of pointer 8. The pointer 8 may incorporate its own position marker so that its position can be determined either with respect to both/either of the head-mounted display mask 2 and the external sensor array 7.

Some of the sensors 4, 5, 6 are mounted on the mask 2 or in the HMD and other sensors 7, 8 are remote from the HMD. One category of sensors 4, 6, 7 determine the position and attitude in the real environment of the HMD and measure HMD movements via accelerometers and the like, e.g., HMD mounted accelerometers measure HMD movement, location and attitude (roll, pitch, yaw). The pointer 8 or other user interface device such as a joystick, pointer or glove is used to take commands from the user. A remote sensor array 7 can track the position of the HMD on the user in a "safe zone" created by the user and visible to the user within the virtual environment.

A user wears the mask 2 and sees images on the one or more displays 3 inside the mask 2 while holding the user interface 8, which may also appear in the images on the screen 3. Preferably, the images provided by the display are stereoscopic images of a virtual environment. The delivery system is configured to deliver optionally an audio signal synchronized to the image or video signal. Preferably, the delivery system delivers synced audio as part of the virtual reality experience, via the HDMI port.

The user interface 8 may be a wearable element such as a glove, sock or wristband or may be a distinct element such as a joystick or pointer.

Data from all the sensors are fed by a wired connection and/or by a wireless connection to a console 10, which is also responsible for delivering image data to the one or more display screens 3 in the mask 2.

Figure 2:
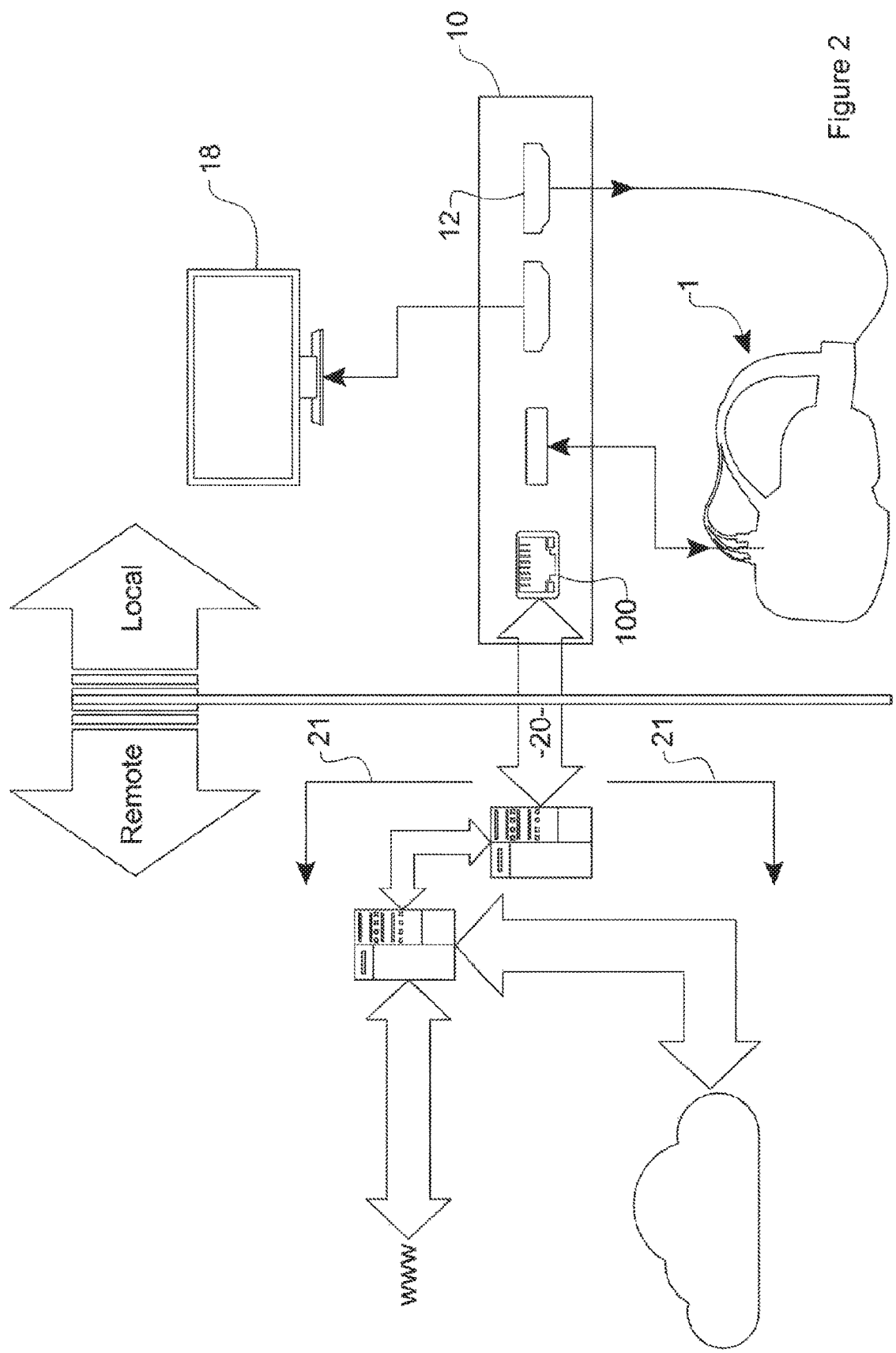
FIG. 2 is a schematic representation of an embodiment of the disclosure in communication with remote processing and graphics resources.

The console 10 is shown in FIG. 2 connected up to an external monitor 18 so that an administrator or operator other than the wearer of the head-mounted display 2 can see the images on the external monitor 18 that are being displayed on the worn mask 2.

Unlike conventional systems, the console 10 comprises a head-mounted display image delivery system 10, which has at least one input port 100 configured to receive pre-processed image data for direct display of the field of view 50 on the one or more displays 3 without image processing by the image delivery system 10. The console 10 embodying the disclosure delivers image data for direct display on the one or more displays 3 of the field of view 50 without image processing by the head-mounted display system 1.

Preferably, the console 10 and the head-mounted display mask 2 are local to one another, either in the same space or room and, more preferably, on the same wireless network or also preferably in communication with one another over a wired connection. Preferably, the connection to the head-mounted display mask 2 for the image to be displayed is over an HDMI connection and the data connection from the mask to the console 10 is via a USB connection.

Virtual reality displays require significant graphics processing and computational resources. In embodiments of the disclosure, the graphics processing and computational resources 21 are provided remote from the head-mounted display system 1 and console 10 but connected to these local elements by a low-latency communication bus 20. The graphics processing can be by way of a GPU computing cloud sitting on a virtual reality cluster CUDA. The virtual reality operator provides a proprietary infrastructure 21 to coordinate packaging and distribution of data over the low-latency communication bus 20 and to the remote elements providing the graphics processing and computational resources. The communication bus 20 is connected to the console 10 through input port 100.

The graphics processing and computational resources 21 are provided remote from the head-mounted display 1 and console 10. In this way the console 10 has to provide only very light, if any, image processing. The graphics processing and computational resources 21 are responsible for the majority if not all the image processing and rendering images for transmission over communication bus 20 to the console 10. The console does not require or have the functionality to do any further significant image processing except to potentially reformat the image for compatibility with the HMD screen 3 settings. More image processing is conducted at the remote graphics processing and computational resources 21 than at the console 10 and preferably no image processing is conducted at the HMD 1. All the rendering of images may be conducted at the remote graphics processing and computational resources 21.

Figure 3:
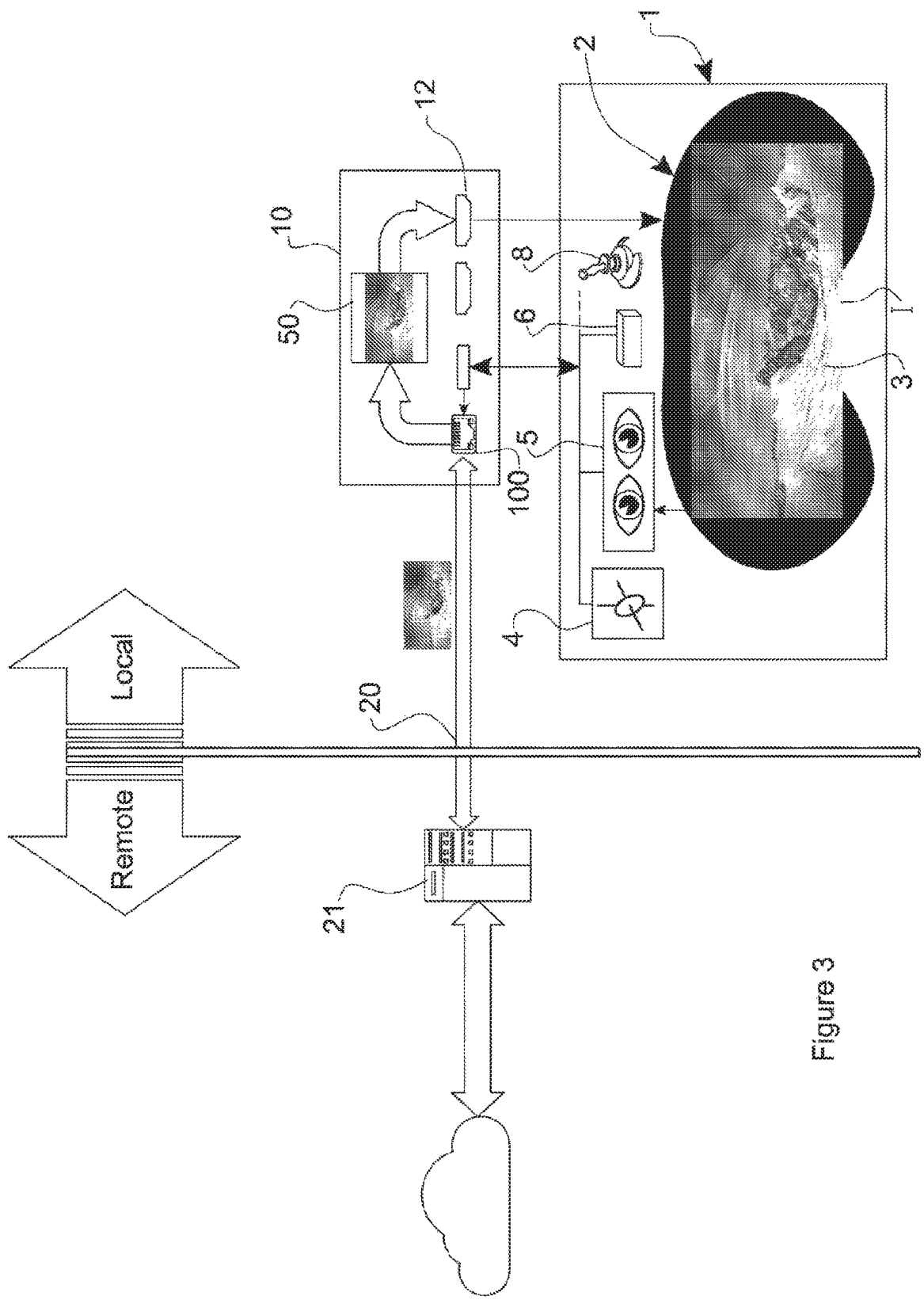
FIG. 3 is a schematic representation of an embodiment of the disclosure in communication with remote processing and graphics resources and showing detail of the head-mounted display screen.

Turning now to FIG. 3, the virtual environment being displayed on the HMD screen 3 is an alpine panorama. The wearer/user is looking ahead directly, straight and level with the horizon broadly mid-screen. The console 10 embodying the disclosure calls for an image to be rendered off the scene over communication bus 20 and the image is rendered and delivered back over communication bus 20 as image I, which is reported as directly as possible without graphics processing or pre-processing through the console HDMI output 12 directly to the screen 3, which shows a field of view 50 of the image I.

The head-mounted display system sensors 4, 5, 6, 7, 8 are monitoring the wearer's activities and identifying where the wearer is looking so as to ascertain what the next field of view 50 will be displayed to the wearer. The console 10 receives sensor data 4, 5, 6, 7, 8 from the head-mounted display and calls for the next field of view image, which is then prepared and rendered remotely and delivered over the communication bus 20 to the console 10 where it is passed to the screen 3 without image processing by the console/image delivery system 10. The images I output from the console 10 to the head-mounted display system 1 are sent without image processing by the head-mounted display image delivery system 10.

Because the graphics processing computational resources 21 are connected over a low latency communications bus, the console 10 can be computationally basic in nature. The latency threshold should be less than 20 microseconds.

Figure 4:
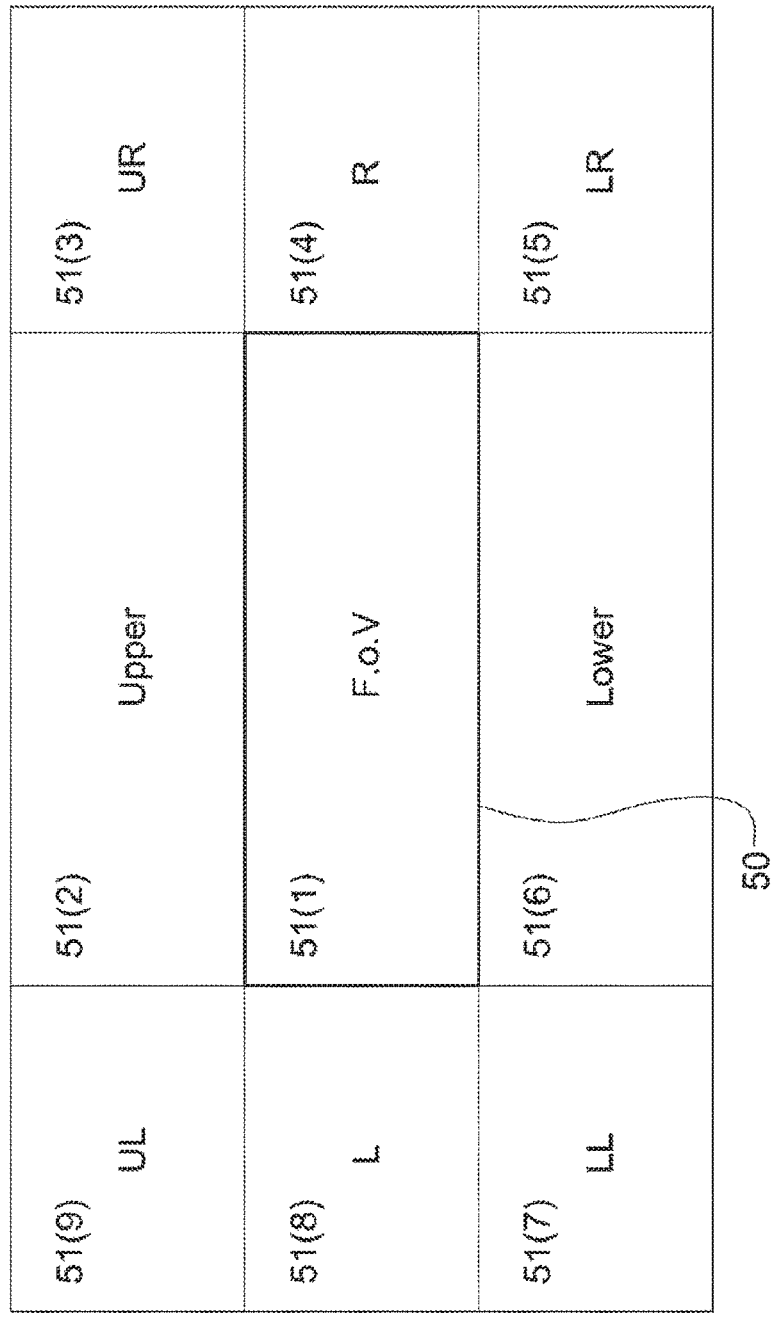
FIG. 4 is a schematic representation of an array of image data for use with embodiments of the disclosure.
Figure 9:
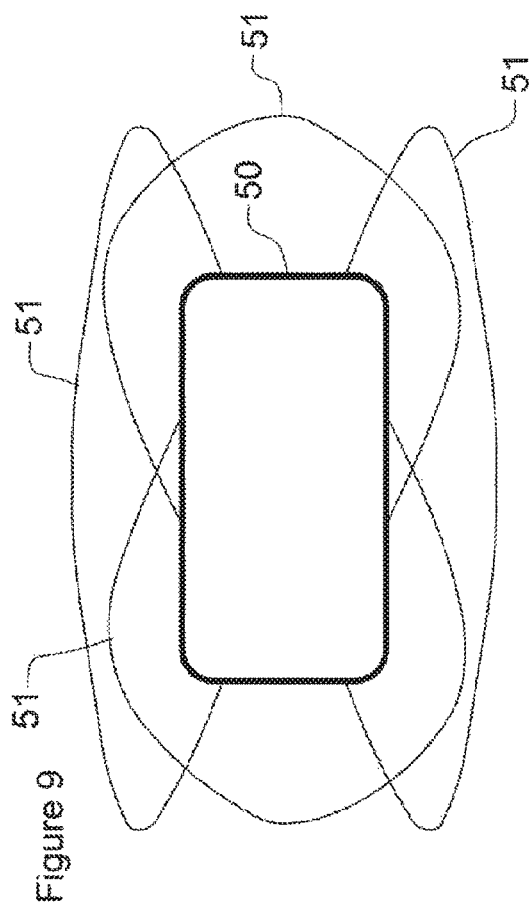
FIGS. 9 to 12 are schematic representations of fields of view for use with embodiments of this disclosure.
Figure 10:
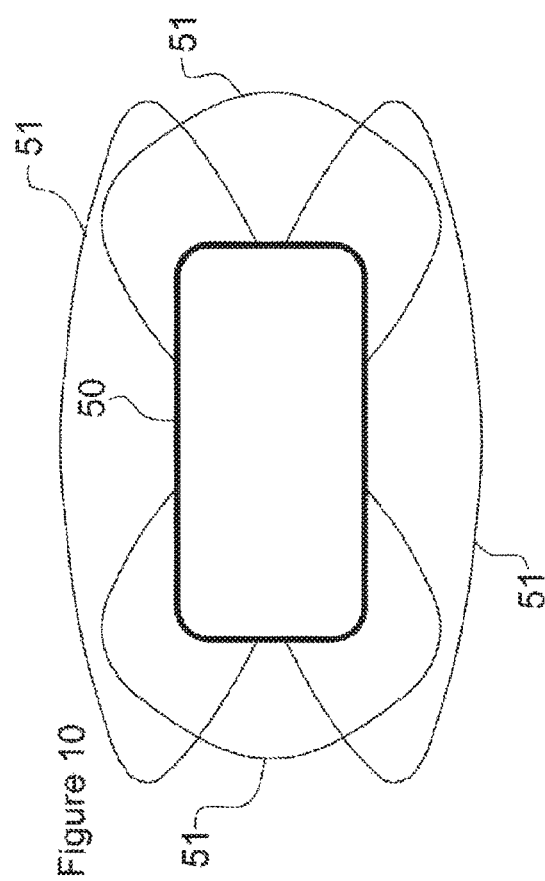
Figure 11:
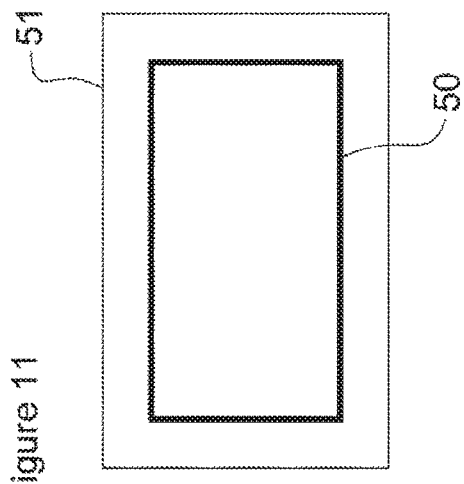
Figure 12:
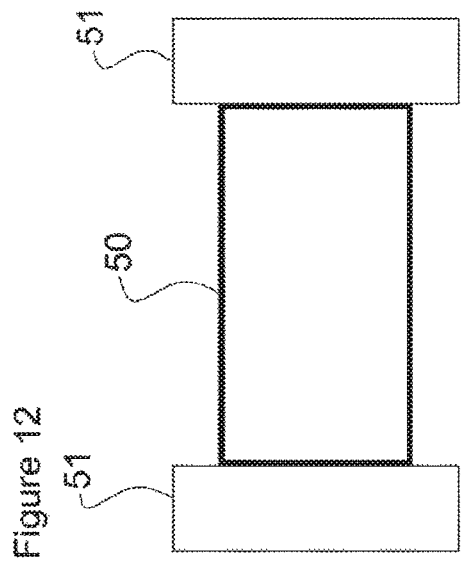

FIG. 4 shows a field of view (FOV1) 50(1), which is the image being displayed on the screen 3. Outside the field of view 51(1) the image continues in the virtual environment but those regions 51(2-9) of the image I that lie outside the field of view 51(1) are not displayed. The regions lying outside the field of view (FOV1) lie above 51(2) and below 51(6), to the left 51(8) and the right 51(4) and to the upper right 51(3), lower right 51(5), lower left 51(7) and upper left 51(9) corners. FIG. 4 shows the regions as substantively rectangular but the regions can be defined differently—see FIGS. 9 to 12 where the regions 51 outside the field of view (FOV1) 50 are shown as elliptical lobes 51 in FIGS. 9 and 10 and as a rectangular periphery at FIG. 11 and as side bars in FIG. 12.

Figure 5:
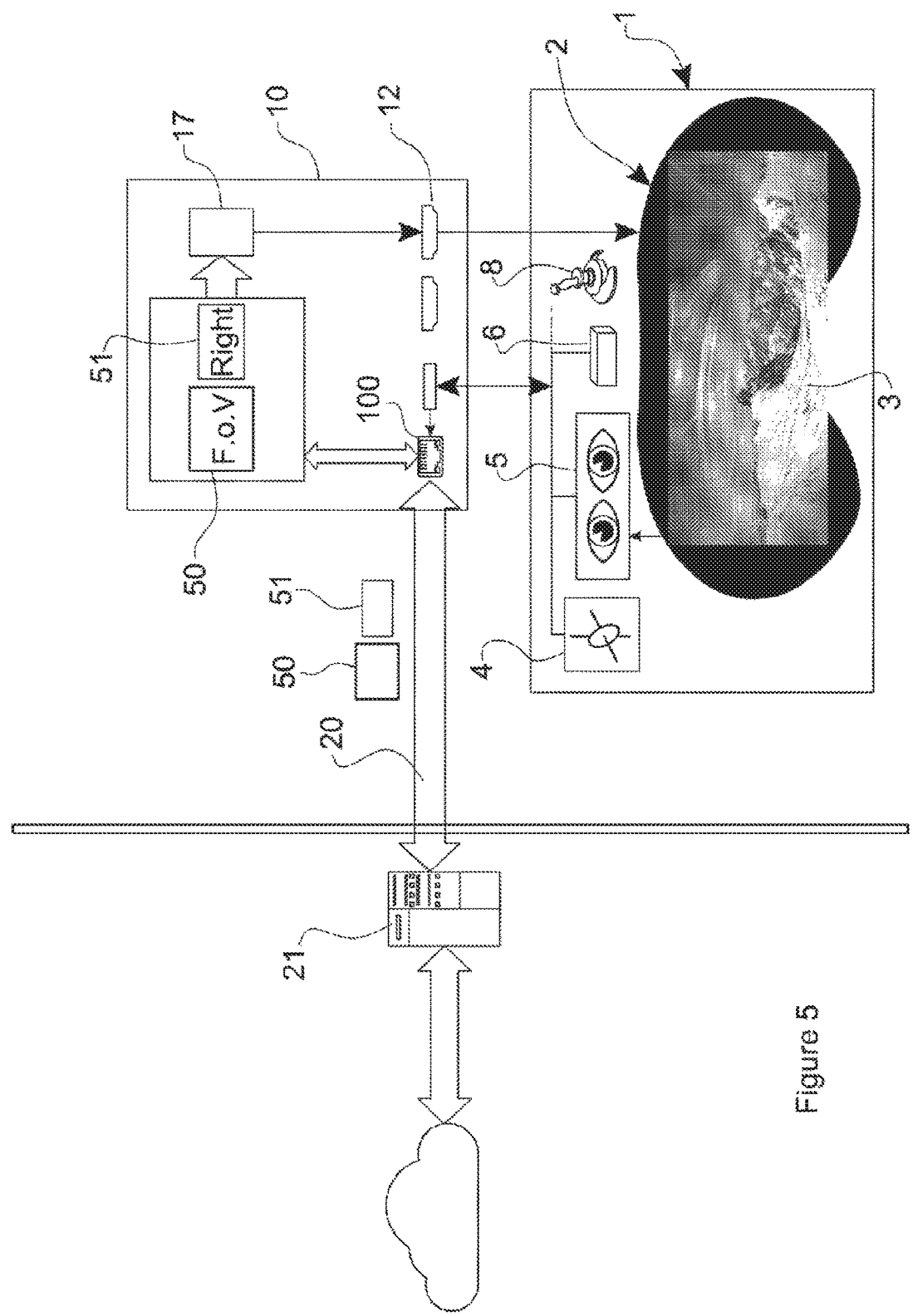
FIG. 5 is a schematic representation of an embodiment of the disclosure in communication with remote processing and graphics resources and showing detail of the head-mounted display screen.

FIG. 5 shows a further embodiment of the disclosure in which the HMD sensor data 4, 5, 6, 7, 8 is used at the remote graphics processing and computations resource center 21 to return not only the field of view image data over communication bus 20 but also image data in addition to the field of view of image data of images lying at least partially outside the field of view and not yet displayed on the screen 3. In the example in FIG. 5, the HMD sensor data is utilized by the remote computational resources to predict that the wearer will next look to the right of the field of view so as well as rendering the field of view, the remote computational resource also renders and sends image data to the right of the field of view back to the console 10 over the low-latency communication bus 20. If the console 10 identifies that the wearer has indeed moved their gaze to the right of the display field of view, then a selector 17 can pick a revised version of the field of view so as to display the right hand side of the field of view together with the "right" region of image data to the right of the field of view.

Figure 6:
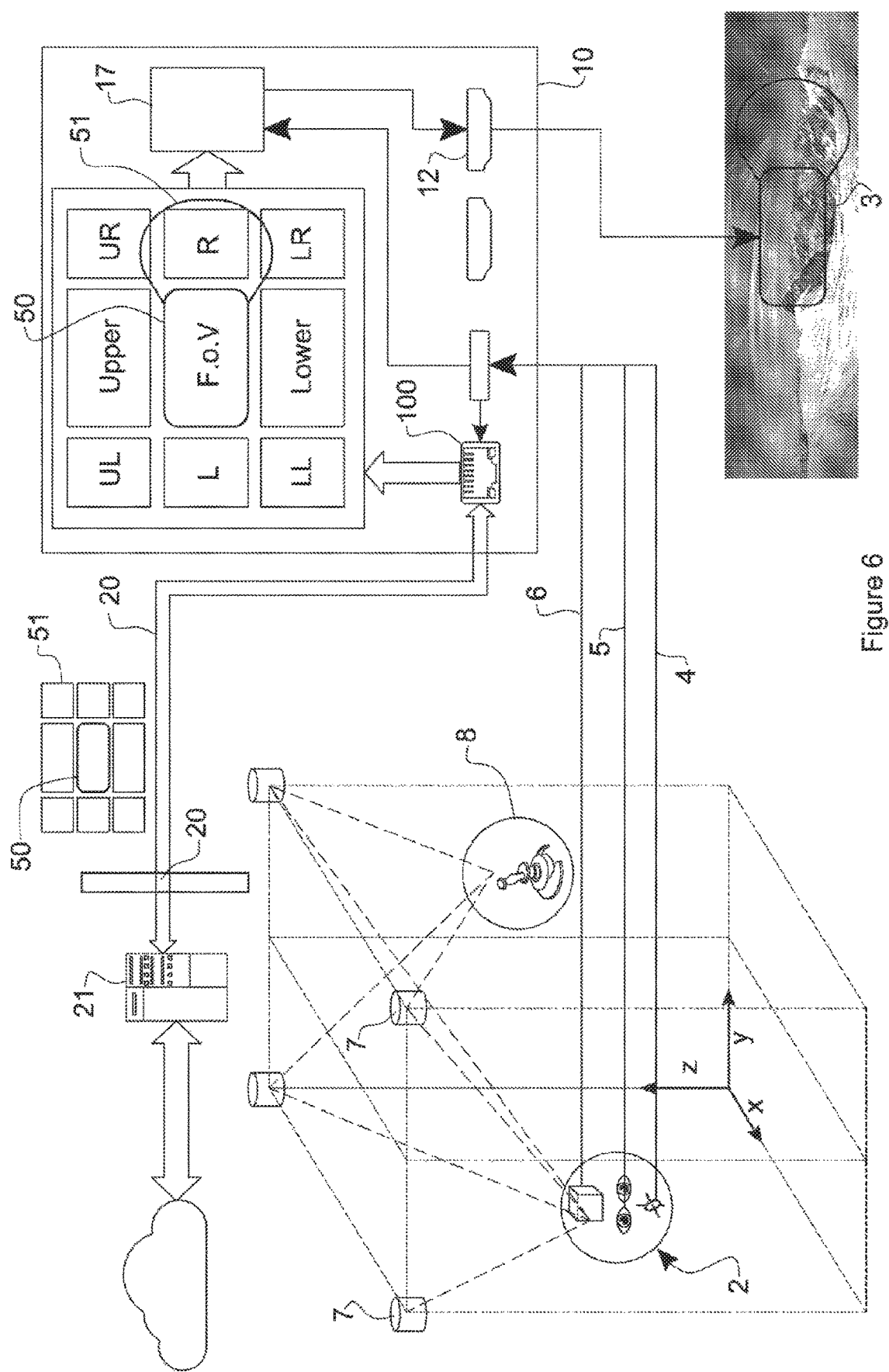
FIG. 6 is a schematic representation of an embodiment of the disclosure in communication with remote processing and graphics resources and showing detail of the head-mounted display screen.

Referring now to FIG. 6, a further embodiment of the disclosure sends the HMD sensor data 4, 5, 6, 7, 8 directly to the selector 17 in the local console 10. In this embodiment, the sensor data is not transmitted over communication bus 20 to the remote graphics processing or computational resources. The sensor data remains local to the head-mounted display system and the console 10.

In addition to rendering the field of view, the remote graphics processing computational resources 21 transmit over the communication bus 20 all of the regions 51(2-9) surrounding the field of view 51(1) and provide those to the local console 10 where they are pre-stored and available for selection by the selector 17. The selector 17 is operable under the control of the sensor data and in response to the sensor data to predict or identify where the gaze of the wearer falls next outside the field of view and, in response to that directional change of the wearer's gaze, the selector 17 picks the pre-stored region outside the field of view and delivers that directly to the head-mounted display screen without further pro-processing or graphics processing. Keeping the sensor data and the prediction functionality local to the console and the head-mounted display allows the console to be autonomous from the remotely located graphics processing and computational resources.

FIG. 7 shows the field of view (FOV 1) and a right hand region outside FOV 1, which is buffered in the console 10 (i.e., the right hand region is received but not displayed in the FOV) ready for immediate delivery when the wearer's gaze turns to the right side of FOV 1. This form of buffering is referred to in this document as "pre-storing." Likewise, FIG. 8 shows an outside region above FOV 1 that is buffered (or pre-stored) in the console 10 ready for immediate delivery to the head-mounted display screen.

The range of sensors available to the system can also include eye trackers that identify the portion of the screen the user is looking at or moving to by monitoring their gaze (also known as gaze trackers)—such sensors are optical-based non-invasive and mounted inside the headset.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

The invention claimed is:

1. A head-mounted display image delivery system in combination with a head-mounted display (HMD) device, the image delivery system and the HMD device being local to one another, the combination further comprising a graphics processing and computational resource remote from the image delivery system and the HMD device and connected to the image delivery system and the HMD device by a communication bus:
    the HMD device comprising:
        one or more displays;
        one or more sensors to determine movement, position and attitude of the display; and
        one or more image inputs configured to receive image data for direct display on the one or more displays without image processing by the HMD from the image delivery system,
    the image delivery system being configured to communicate a stereoscopic image to the HMD device to convey image information to a wearer, wherein the image delivery system comprises:
        one or more inputs to receive sensor data from the sensors;
        one or more image inputs configured to receive pre-processed image data for direct display of a field of view on the one or more displays without image processing by the image delivery system; and
        one or more image outputs to deliver image data for direct display on the one or more displays of the field of view without image processing by the HMD device, wherein:
        the graphics processing and computational resource has functionality to conduct a majority of the image processing and rendering of images over the communication bus to the image delivery system and wherein the delivery system is operable to receive the pre-processed image data of the field of view and in addition to receive additional pre-processed image data of images outside the field of view and not yet displayed on the display.

2. A head-mounted display image delivery system in combination with a head-mounted display (HMD) device, the image delivery system and the HMD device being local to one another:
    the HMD device comprising:
        one or more displays;
        one or more sensors to determine movement, position and attitude of the display; and
        one or more image inputs configured to receive image data for direct display on the one or more displays without image processing by the HMD device from the image delivery system,
    the image delivery system being configured to communicate a stereoscopic image to the HMD device to convey image information to a wearer, wherein the image delivery system comprises:
        one or more inputs to receive sensor data from the sensors;
        one or more image inputs configured to receive pre-processed image data for direct display of a field of view on the one or more displays without image processing by the image delivery system and wherein the delivery system is operable to receive the pre-processed image data of the field of view and in addition to receive additional pre-processed image data of images the field of view and not yet displayed on the display; and
        one or more image outputs to deliver image data for direct display on the one or more displays of the field of view without image processing by the HMD device.

3. The combination of claim 2, wherein at least one of:
    the HMD device and the image delivery system are configured to be wirelessly connected to one another on the same network or by a near-field communication method; or
    the HMD device and the image delivery system are configured to be connected to one another with a wired connection.

4. The combination of claim 2, wherein the delivery system comprises a buffer to receive pre-processed image data for direct display of the field of view on the one or more displays without image processing by the image delivery system.

5. The combination of claim 2, wherein the delivery system is configured to deliver an audio signal synchronized to the image or video signal.

6. The combination of claim 2, wherein the additional pre-processed image data is configured to relate to one or more images lying outside the field of view in one or more predetermined directions relative to the field of view.

7. The combination of claim 2, wherein sensor data received from the sensors is configured to be output from one or more delivery system outputs to provide sensor data for processing to a processing resource to determine one or more directions into which the field of view moves.

8. The combination of claim 2, wherein the delivery system has a processing resource and the sensor data received from the sensors is configured to be processed by the delivery system to determine one or more directions into which the field of view moves.

9. The combination of claim 2, wherein at least one of:
    the delivery system is configured to store field of view image data only; or
    the delivery system is configured to store field of view image data and in addition store image data of one or more image regions lying outside the field of view.

10. The combination of claim 2, wherein the delivery system has a selector configured to deliver pre-stored image data to the HMD, selection being based on a predicted direction into which the field of view moves.

11. The combination of claim 2, wherein there is a local data loop in which the delivery system is configured to receive HMD sensor data and determine a direction of the field of view and deliver the image of an image region lying outside the field of view in the determined direction.

12. The combination of claim 10, wherein the determined direction is a direction predicted or derived from HMD sensor data.

13. The combination of claim 2, wherein the HMD sensors are configured to determine one or more of movement, position and attitude of the HMD.

14. The combination of claim 2, wherein sensor data is configured to determine at least one of or any combination of: movement, position, attitude of the display, the wearer's eye position, eye tracking, and the one or more image regions of the display being viewed by the wearer.

15. The combination of claim 2, wherein the HMD sensors include an eye tracking sensor.

16. The combination of claim 2, wherein one or more of the HMD sensors is mounted on or in the HMD.

17. The combination of claim 2, wherein one or more of the HMD sensors is in a local loop and the sensor data is configured to not all be sent remotely so as to inform which pre-processed image data to deliver.

18. The combination of claim 2, wherein a handheld user interface device is configured to take commands from a user of the HMD.

19. The combination of claim 2, wherein a remote sensor array is configured to track the position of the HMD on a user in a safe zone created by the user and visible to the user within a virtual environment.

20. The combination of claim 2, further comprising a processor to generate images to populate a virtual environment and to render the images in stereoscopic 3D for delivery to the HMD via the image delivery system.

21. A method of operating the combination of claim 1, comprising delivering image data for direct display on the one or more displays of the HMD device without image processing by the HMD image delivery system.

* * * * *